United States Patent Office 3,497,501
Patented Feb. 24, 1970

3,497,501
HETEROCYCLIC AMINO ESTERS OF 2-PHENYLACRYLIC ACID
Henry C. Caldwell, Ambler, and William G. Groves, Norristown, Pa., assignors to Smith Kline & French Laboratories, Philadelphia, Pa., a corporation of Pennsylvania
No Drawing. Filed Apr. 22, 1966, Ser. No. 544,386
Int. Cl. C07d 29/24, 27/04; A61k 27/00
U.S. Cl. 260—240                             1 Claim

ABSTRACT OF THE DISCLOSURE

Novel heterocyclic amino esters of 2-phenylacrylic acid which have spasmolytic activity without the usual anticholinergic side effects are provided by this invention.

---

This invention relates to novel heterocyclic amino esters of 2-phenylacrylic acid and to a method of producing gastrointestinal spasmolytic activity using said esters. More specifically this invention relates to a method of producing spasmolytic activity without the concomitant limiting or anticholinergic side effects common to the prior art spasmolytic medicaments.

Prior to the present invention there has been a great need for compounds and compositions which produce spasmolytic activity without the usual anticholinergic side effects, such as, for example, dry mouth, blurred vision and urinary retention which are common to known anticholinergic-antispasmodic medicaments. The need of a safe and effective compound and compositions devoid of the above noted side effects and having spasmolytic activity has been great.

The novel heterocyclic amino esters of 2 - phenylacrylic acid of this invention are represented by the following formula:

Formula 1

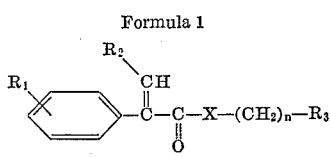

when:

X represents oxygen or sulfur;
$n=0$ to 6 as limited hereafter;
$R_1$ represents hydrogen, a straight or branched chain lower alkyl of 1 to 6 carbon atoms preferably methyl or ethyl, lower alkoxy of 1 to 6 carbon atoms, preferably methoxy or ethoxy, halogen such as bromo, chloro or fluoro, hydroxy, nitro, amino, cyano or trifluoromethyl;
$R_2$ represents phenyl, furyl, thienyl or pyridyl; and
$R_3$ represents when $n$ is from 2 to 6, N-piperidinyl, N-pyrrolidinyl, N-(3-azabicyclo[3.2.2]nonyl, N-(2-azabicyclo[2.2.2]octyl, when $n$ is from 0 to 6, C-(N-loweralkyl)-piperidinyl, C-(N-loweralkyl)-pyrrolidinyl, 3-(1-azabicyclo[2.2.2]octyl or 9 - methyl - 3 - oxa-9-azabicyclo[3.3.1]non-7-yl.

Advantageous compounds of this invention are represented by the above structural formula when X represents oxygen, N is 0 to 4, $R_1$ represents halogen, $R_2$ represents phenyl and $R_3$ represents piperidine or methyl piperidine.

The preferred and most advantageous compound of this invention is represented by the following structural formula:

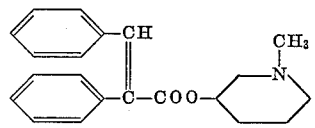

The novel heterocyclic amino esters of 2-phenyl-acrylic acid are prepared according to the following synthetic procedures:

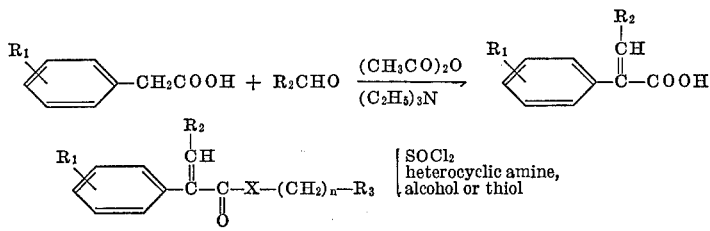

when $R_1$, $R_2$, $R_3$, X and $n$ are as defined above.

The method is carried out using readily available starting materials and gives excellent yields of the end product. Where certain compounds desired for use as starting materials are not available they can be prepared by methods described in the literature and well known to the art for preparing analogous compounds as described in the examples.

The properly substituted phenylacetic acid is converted to the corresponding 3-substituted 2-phenylacrylic acid derivative by reacting the acid with an aromatic aldehyde in an organic solvent such as, acetic anhydride and using a tertiary amine such as triethylamine, pyridine or N,N'-dimethylaniline as a catalyst. The mixture is then heated.

The 2-phenylacrylic acid derivative is then converted to the desired heterocyclic amino ester by preparing the acyl chloride or anhydride first then reacting with the properly substituted heterocyclic amino alcohol or thiol.

This invention also includes nontoxic pharmaceutically acceptable addition salts of the above defined bases formed with organic and inorganic acids. Such salts are easily prepared by methods known to the art. The base is reacted with either the stoichiometric amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylene-salicyclic, methanesulfonic, ethanedisulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzenesulfonic and theophylline acetic acids as well as with the 8-halotheophyllines for example, 8-chlorotheophylline and 8-bromotheophylline. Exemplary of such inorganic salts are those with hydrochloric, hydrobromic, sulfuric, sulfamic, phosphoric, and nitric acids. These salts may also be prepared by the classical method of double decomposition of appriate salts which is well known to the art.

Further, exemplary of salts are nontoxic quaternary ammonium salts of the above defined bases formed with pharmacologically acceptable lower alkyl or ararlkyl esters of, for example, sulfuric, hydrohalic and aromatic sulfonic acids. These salts are prepared by treating a solution of the base in a suitable solvent, such as chloroform, acetone, benzene, toluene or ether with an excess of an organic ester of sulfuric, hydrohalic or aromatic sulfonic acid. This reaction is carried out most advantageously at a temperature in the range of from about 25° C. to about 115° C. Exemplary of such reactive esters are lower alkyl halides of a miximum of 8 carbon atoms such as methyl chloride, methyl bromide, methyl iodide, ethyl chloride, propyl bromide, butyl chloride, isobutyl chloride, ethylene bromohydrin, ethylene chlorohydrin, allyl bromide, methallyl bromide, crotyl bromide, benzyl chloride, benzyl bromide, naphthylmethyl chloride, phenethyl bromide, dimethyl sulfate, diethyl sulfate, methyl benzene sulfate and ethyl toluene sulfonate.

The N-oxide derivatives of Formula 1 are also included in this invention. These derivatives are prepared by reacting the base with a mild oxidizing agent prefarably hydrogen peroxide usually in excess at room temperature in a solvent in which the base is substantially soluble such as an aqueous lower alkyl alcohol solvent, preferably methanol, isopropanol or ethanol.

It will be readily apparent to one skilled in the art that variations of these procedures are possible. The preferably preparative procedures are the methods discussed above.

The substituted heterocyclic amino esters of Formula 1 or a nontoxic salt thereof will be administered to an animal in an amount to produce gastronintestinal spasmolytic activity. Preferably the composition will contain the heterocyclic amino ester ingredient in either a liquid or solid nontoxic pharmaceutical carrier in an amount of from about 10.0 mg. to about 250 mg., advantageously from about 25 mg. to about 125 mg. per dosage unit.

The pharmaceutical carrier may be, for example, either a solid or a liquid. Exemplary of solid carriers are lactose, magnesium stearate, terra alba, sucrose, talc, stearic acid, gelatin, agar, pectin or acacia. Exemplary of liquid carriers are peanut oil, olive oil, sesame oil and water. Similarly, the carrier or diluent may include a time delay material such as glyceryl monostearate or glyceryl distearate alone or with a wax.

A wide variety of pharmaceutical forms can be employed. Thus, if a solid carrier is used, the preparation can be tableted, placed on a hard gelatin capsule or in the form of a troche or lozenge. The amount of solid carrier will vary widely but preferably will be from about 25 mg. to about 1 gm. If a liquid carrier is used, the preparation may be in the form of a soft gelatin capsule, placed in an ampule or in a liquid suspension.

The method in accordance with this invention comprises administering internally, preferably orally to an animal a compound of Formula 1 or a nontoxic salt thereof preferably admixed with a pharmaceutical carrier, in an amount sufficient to induce a spasmolytic but nontoxic effect. The properly substituted heterocyclic amino ester of 2-phenyl-acrylic acid preferably will be, per unit, in an amount of from about 10.0 mg. to about 250 mg. and advantageously from about 25 mg. to about 125 mg. The administration may be parenterally or orally, the latter being the preferable route of administration. Advantageously equal doses will be administered one to four times daily. Preferably the daily dosage will be from about 10.0 mg. to about 1000 mg. and most advantageously from about 25 mg. to about 500 mg. of active medicament in pharmaceutical forms. When the administration described above is carried out, spasmolytic activity is achieved without the mydriatic and antisalivary side effects common to known antispasmodic drugs.

The following examples are not limiting but are illustrative of compounds of this invention and the procedures for their preparation. Other variations of this invention will be obvious to those skilled in the art.

EXAMPLE 1

To a mixture containing 30.0 g. of p-chlorophenylacetic acid, 20.01 ml. of benzaldehyde and 24.4 ml. of triethylamine is added with cooling 66.4 ml. of acetic anhydride. The mixture is stirred for approximately ½ hour and then heated to 70° C. The temperature is raised to 100° C. for a period of ½ hour and then the mixture is heated for approximately six additional hours. 100 ml. of benzene is added and the solution is extracted with four 125 ml. portions of hot 10% sodium hydroxide. The solution is then cooled and made acidic with concentrated hydrochloric acid. The crude acid is filtered, dried and recrystallized from alcohol to yield 2-p-chlorophenyl-3-phenylacrylic acid as a white solid melting at 180° C. to 181.5° C.

A suspension of 13.8 g. of 2-p-chlorophenyl-3-phenylacrylic acid, 10.0 ml. of thionyl chloride about 10 ml. of dry benzene is warmed gently until a solution results. The clear solution is refluxed for about an hour and the excess thionyl chloride and benzene is removed. The solution is further washed with three portions of dry benzene. The resulting oil in 20 ml. of dry benzene is slowly added with cooling to a mixture of 5.7 g. of 1-methyl-3-piperidinol and 7 ml. of triethylamine in 100 ml. of dry benzene. The solution is stirred for about ½ hour at room temperature and then at 60° C. to 70° C. for about one hour. The mixture is filtered to remove triethylamine hydrochloride and the benzene is distilled off to yield 1-methyl-3-piperidinyl 2-p-chlorophenyl-3-phenylacrylate.

An ethereal solution of the free base is treated with hydrogen chloride to yield the salt as a white solid and having a melting point of 276.5° C. to 277.5° C. with decomposition.

EXAMPLE 2

Similarly using the above procedure 5.7 g. of 1-methyl-4-piperidinol used as a starting material yielded 1-methyl-4-piperidinyl 2-p-chlorophenyl-3-phenylacrylate.

An ethereal solution of the free base is treated with hydrogen chloride to yield the hydrochloride salt as a white solid and having a melting point of 220° C. to 221° C.

An ethereal solution of the base is reacted with an excess of ethyl iodide to separate the ethiodide quaternary salt.

EXAMPLE 3

Employing the procedure outlined in Example 1 and using 6.6 g. of 1-methyl-3-piperidinethiol as a starting material in place of the piperidinol yielded 1-methyl-3-thiopiperidinyl 2-p-chlorophenyl-3-phenylacrylate.

EXAMPLE 4

A solution of 13.8 g. of 2-p-chlorophenyl-3-phenylacrylic acid chloride as prepared in Example 1 in 20 ml. of dry benzene is slowly added with cooling to a mixture of 6.5 g. of 1-piperidinethanol and 7 ml. of triethylamine in 100 ml. of dry benzene. The solution is stirred for about ½ hour at room temperature and then at 60° C. to 70° C. for about one hour. The mixture is filtered to remove triethylamine hydrochloride and the benzene is distilled off to yield 2 - piperidinoethyl 2-p-chlorophenyl-3-phenylacrylate.

An ethereal solution of the free base is treated with hydrogen chloride to yield the salt as a white solid and having a melting point of 182.5° C. to 183.5° C.

EXAMPLE 5

Using 11.2 g. of 2,3-diphenylacrylic acid as the starting material the acid chloride is prepared following the procedure outlined in Example 1. A solution of the 2,3-diphenylacrylic acid chloride in 50 ml. of dry benzene is slowly added with cooling to a mixture of 5.7 g. of 1-methyl-3-piperidinol and 7 ml. of triethylamine in 100 ml. of dry benzene. The solution is stirred for about ½ hour at room temperature and then at 60° C. to 70° C. for about one hour. The mixture is filtered to remove triethylamine hydrochloride and the benzene is distilled off to yield 1-methyl-3-piperidinyl-2,3-diphenylacrylate.

An ethereal solution of the free base is treated with hydrogen chloride to yield the hydrochloride salt as a white solid and having a melting point of 177° C. to 178° C.

EXAMPLE 6

Similarly using the above procedure 5.7 g. of 1-methyl-4-piperidinol used as a starting material yielded 1-methyl-4-piperidinyl 2,3-diphenylacrylate.

An alcoholic solution of the free base is reacted with 30% hydrogen peroxide solution at room temperature. The reaction mixture is filtered and concentrated to give 1-methyl-4-piperidinyl 2,3-diphenylacrylate N-oxide.

EXAMPLE 7

The solution of 13.8 g. of 2-p-chlorophenyl-3-phenylacrylic acid chloride as prepared in Example 1 in 20 ml. of dry benzene is slowly added with cooling to a mixture of 6.5 g. of 1-ethyl-2-pyrrolidine-methanol and 7 ml. of triethylamine in 100 ml. of dry benzene. The solution is stirred for about ½ hour at room temperature and then at 60° C. to 70° C. for about one hour. The mixture is filtered to remove triethylamine hydrochloride and the benzene is distilled off to yield (1-ethyl-2-pyrrolidinyl)methyl 2-p-chlorophenyl-3-phenylacrylate.

EXAMPLE 8

To a mixture containing 30.0 g. of p-chlorophenylacetic acid, 16.3 ml. of 2-thiophenealdehyde and 24.4 ml. of triethylamine is added 66.4 ml. of acetic anhydride. The mixture is heated at 150° C. for about ½ hour and cooled to room temperature. The liquid as acidified with concentrated hydrochloric acid and the precipitated crude acid is extracted with 300 ml. of methylene chloride. The methylene chloride solution is washed with about 500 ml. of water and then extracted several times with 2% sodium hydroxide and the basic solution cooled in ice. The solution is acidified with glacial acetic acid, cooled to 5° C., and the acid filtered and dried. The acid is recrystallized from alcohol to yield 2-p-chlorophenyl-3-(2-thienyl)acrylic acid as a yellow-white solid having a melting point of 222° C. to 223° C.

A solution of 26.4 g. of 2-p-chlorophenyl-3-(2-thienyl) acrylic acid chloride, prepared following the procedure of Example 1, in 150 ml. of dry benzene is slowly added with cooling to 33.8 g. of 3-azabicyclo[3.2.2.]nonane-3-ethanol in 200 ml. of dry benzene. The solution is stirred at room temperature for about ½ hour and then at 60° C. to 70° C. for about two hours. The mixture is filtered to remove 3-azabicyclo[3.2.2]nonane-3-ethanol hydrochloride and the benzene is distilled off to yield 2-(3-azabicyclo[3.2.2]non-3-yl)ethyl 2-p-chlorophenyl-3-(2-thienyl) acrylate.

EXAMPLE 9

In like manner using the procedure of Example 8 42.2 g. of β,β-dimethyl-3-azabicyclo[3.2.2]nonane-3-propanol as a starting material in place of 3 - azabicyclo[3.2.2] nonane-3-ethanol yielded 3 - (3-azabicyclo[3.2.2]non-3-yl)-2,2 - dimethylpropyl 2-p-chlorophenyl-3-(2-thienyl) acrylate. An ethereal solution of the free base is treated with hydrogen chloride to yield the hydrochloride salt melting at 202° C.–203° C.

EXAMPLE 10

To a mixture containing 58.4 g. of p-methoxyphenyl-acetic acid, 35.8 ml. of benzaldehyde and 48.8 ml. of triethylamine is added with cooling 132.8 ml. of acetic anhydride. The mixture is stirred for approximately ½ hour and then heated in an oil bath at 70° C. The temperature is raised to 100° C. over a ½ hour period and heating continued for approximately five hours. The solution is cooled and made acidic with concentrated hydrochloric acid. The crude acid is filtered, dried and recrystallized from alcohol to yield 2-p-methoxyphenyl-3-phenylacrylic acid as a yellow-white solid having a melting point of 152° C. to 154° C.

A solution of 43.8 g. of 2-p-methoxyphenyl-3-phenylacrylic acid chloride, prepared following the procedure outlined in Example 1, 70 ml. of dry benzene and 30 ml. of thionyl in 20 ml. of dry benzene is slowly added with cooling to a mixture of 27.2 g. of 9-methyl-3-oxa-9-azabicyclo[3.3.1]nonane-7-ol and 24.2 ml. of triethylamine in 200 ml. of dry benzene. The solution is stirred for about ½ hour at room temperature and then at reflux for about one hour. The mixture is filtered to remove triethylamine hydrochloride and the benzene is distilled off to yield 9-methyl - 3-oxa-9-azabicyclo[3.3.1]non-7-yl 2-p-methoxyphenyl-3-phenylacrylate. An ethereal solution of the free base is treated with hydrogen chloride to yield the salt as a white solid, M.P. 267–267.5° C.

EXAMPLE 11

Using 13.5 g. of 2-(m-nitrophenyl)-3-phenylacrylic acid as the starting material the acid chloride is prepared following the procedure outlined in Example 1. A solution of the acid chloride in 50 ml. of dry benzene is slowly added to 5.7 g. of 1-methyl-3-piperidinol and 7 ml. of triethylamine in 100 ml. of dry benzene. The solution is stirred at room temperature for about ½ hour and then at 60° C. to 70° C. for about two hours. The mixture is filtered to remove triethylamine hydrochloride and the benzene is distilled off to yield 1-methyl-3-piperidinyl 2-m-nitrophenyl-3-phenylacrylate.

An ethereal solution of the free base is treated with hydrogen chloride to yield the hydrochloride salt. The salt is dissolved in methanol and reduced with hydrogen on the Parr Apparatus with platinum on carbon (5%) as the catalyst. The catalyst is filtered off and the solution is concentrated to yield 1-methyl-3-piperidinyl 2-m-aminophenyl-3-phenylacrylate.

EXAMPLE 12

Employing the procedure outlined in Example 11 and using 7.8 g. of 2-azabicyclo[2.2.2]octane-2-ethanol and 6.4 g. of 1-azabicyclo[2.2.2]octan-3-ol respectively as starting materials in place of the piperidinol yielded 2-(2-azabicyclo[2.2.2]octan-2-yl)ethyl 2 - m - aminophenyl-3-phenylacrylate and 1-azabicyclo[2.2.2]octan-3-yl 2-m-aminophenyl-3-phenylacrylate.

EXAMPLE 13

A solution of 11.5 g. of 2-phenyl-3-(2-thienyl) acrylic acid chloride, as prepared following the procedure outlined in Example 1, in 50 ml. of dry benzene is added slowly with cooling to 5.7 g. of 1-methyl-3-piperidinol and 7 ml. of triethylamine in 100 ml. of dry benzene. The solution is heated at 60° C. to 70° C. for about two hours and filtered to remove triethylamine hydrochloride. The benzene is distilled to yield 1-methyl-3-piperidinyl 2-phenyl-3-(2-thienyl)acrylate as an oily base.

EXAMPLE 14

Similarly following the procedure of Example 13, 13.4 g. of 2-p-chlorophenyl-3-(2-thienyl) acrylic acid substituted as a starting material for 2-phenyl-3-(2-thienyl) acrylic acid yielded 1-methyl-3-piperidinyl 2-p-chlorophenyl-3-(2-thienyl) acrylate as an oily base.

EXAMPLE 15

To a mixture containing 30.0 g. of p-chlorophenylacetic acid, 14.5 ml. of 2-furfural and 24.4 ml. of triethylamine is added 66.4 ml. of acetic anhydride. The mixture is heated on an oil bath one hour, cooled to room temperature and taken up in acetone. The solution is heated with activated carbon, filtered and the acetone evaporated. The mixture is then acidified with concentrated hydrochloric acid, cooled and filtered. The crude acid is recrystallized twice from alcohol to yield 2-p-chlorophenyl-3-(2-furyl)acrylic acid as a yellow-white solid melting at 212° C. to 213° C.

A solution of 14.5 g. of 2-p-chlorophenyl-3-(2-furyl) acrylic acid chloride, as prepared following the procedure outlined in Example 1, in 20 ml. of dry benzene is slowly added with cooling to a mixture 7.7 g. of 1-methyl-3-piperidinol and 9 ml. of triethylamine in 100 ml. of dry benzene. The solution is stirred for about half hour at room temperature and then at 60° C. to 70° C. for about an hour. The mixture is filtered to remove triethylamine hydrochloride and the benzene is distilled off to yield 1 - methyl-3-piperidinyl 2-p-chlorophenyl-3-(2-furyl)acrylate as an oily base.

EXAMPLE 16

To a mixture containing 30.0 g. of p-chlorophenylacetic acid, 18.5 g. of 4-pyridylcarboxaldehyde, 24.4 ml. of triethylamine is added 66.4 ml. of acetic anhydride. The mixture is stirred for approximately one hour at room temperature. The solution is cooled and made acetic with concentrated hydrochloric acid. The crude acid is filtered, dried and recrystallized from alcohol to yield 2-p-chlorophenyl-3-(4-pyridyl)acrylic acid having a melting point of 278° C. to 279° C.

To an oily solution of 15.0 g. of 2-p-chlorophenyl-3-(4-pyridyl)acrylic acid chloride, as prepared following the procedure outlined in Example 1, is added 9.5 g. of 1-methyl-4-piperidinol and the mixture is then chilled. To this mixture is added 25 ml. of dry pyridine and the solution is stirred for about ½ hour at room temperature and then at 60° C. to 70° C. for one hour. The mixture solidifies during this process and 30 ml. of dry pyridine is added. Then 100 ml. of water is added and the solution warmed and treated with charcoal. The solution is made basic and the free base is extracted with ether and dried. The pyridine is removed by treatment with several portions of benzene. The benzene is distilled off to yield 1-methyl-4-piperidinyl 2-p-chlorophenyl-3-(4-pyridyl) acrylate as an oily base.

EXAMPLE 17

| Ingredients: | Mg./tablet |
|---|---|
| 1-methyl-3-piperidinyl 2,3-diphenylacrylate hydrochloride | 10 |
| Calcium sulfate dihydrate | 100 |
| Sucrose | 25 |
| Starch | 15 |
| Talc | 5 |
| Stearic acid | 3 |

The sucrose, calcium sulfate and 1-methyl-3-piperidinyl-2,3-diphenylacrylate are throughly mixed and granulated with hot 10% gelatin solution. The wetted mass is passed through a #16 U.S. standard mesh screen directly onto drying trays. The granules are dried at 120° F. and passed through a #20 U.S. standard mesh screen. These granules are then mixed with starch, talc and stearic acid, passed through a #60 U.S. standard mesh screen and then compressed into tablets.

One tablet is administered four times a day.

EXAMPLE 18

| Ingredients: | Mg./capsule |
|---|---|
| 1-methyl-4-piperidinyl 2-p-chlorophenyl-3-phenylacrylate | 25 |
| Lactose | 275 |

The ingredients are thoroughly mixed and filled into a #2 hard gelatin capsule.

One capsule is administered twice a day.

What is claimed is:
1. A chemical compound having the following structure:

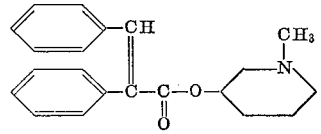

References Cited

UNITED STATES PATENTS

| 3,103,515 | 9/1963 | Zaugg et al. | 260—292 |
| 3,317,544 | 5/1967 | Caldwell et al. | 260—240 XR |
| 3,351,530 | 11/1967 | Caldwell et al. | 167—65 |

OTHER REFERENCES

Chemical abstracts I, vol. 45, col. 263 (1951) (abstract of Mercier et al.).

Chemical abstracts II, vol. 45, col. 5809 (1951) (abstract of Mercier et al.).

Kase et al., J. Med. Chem., vol. 6, pp. 118 to 122 (1963).

JOHN D. RANDOLPH, Primary Examiner

U.S. Cl. X.R.

260—332.2, 347.3, 465, 295, 518, 520, 515, 544; 424—268, 274, 248